(No Model.)

L. O. ORTON.
MACHINE FOR ROLLING SAWS.

No. 338,434. Patented Mar. 23, 1886.

WITNESSES:
L. Douville
W. F. Kircher

INVENTOR:
Lyman O. Orton
BY John A. Wiedersheim
ATTORNEY.

UNITED STATES PATENT OFFICE.

LYMAN O. ORTON, OF PHILADELPHIA, PENNSYLVANIA.

MACHINE FOR ROLLING SAWS.

SPECIFICATION forming part of Letters Patent No. 338,434, dated March 23, 1886.

Application filed August 6, 1885. Serial No. 173,681. (No model.)

*To all whom it may concern:*

Be it known that I, LYMAN O. ORTON, a citizen of the United States, residing in the city and county of Philadelphia, State of Pennsylvania, have invented a new and useful Improvement in Saw-Rolling Machines, which improvement is fully set forth in the following specification and accompanying drawings, in which—

Figure 1:
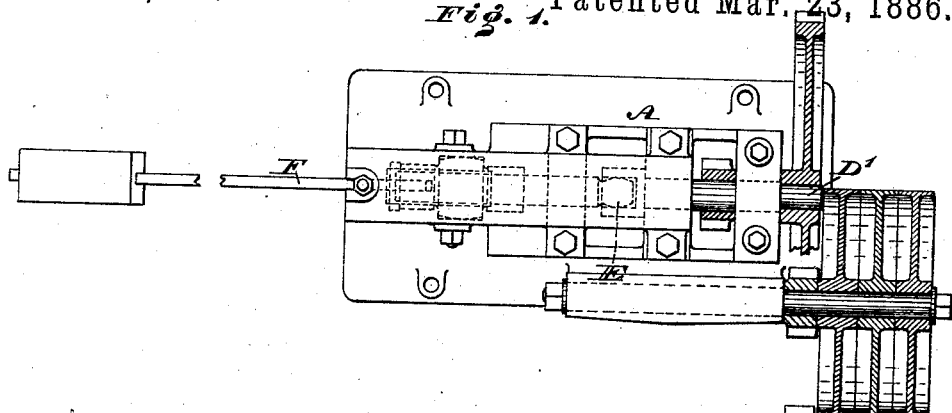
Figure 2:
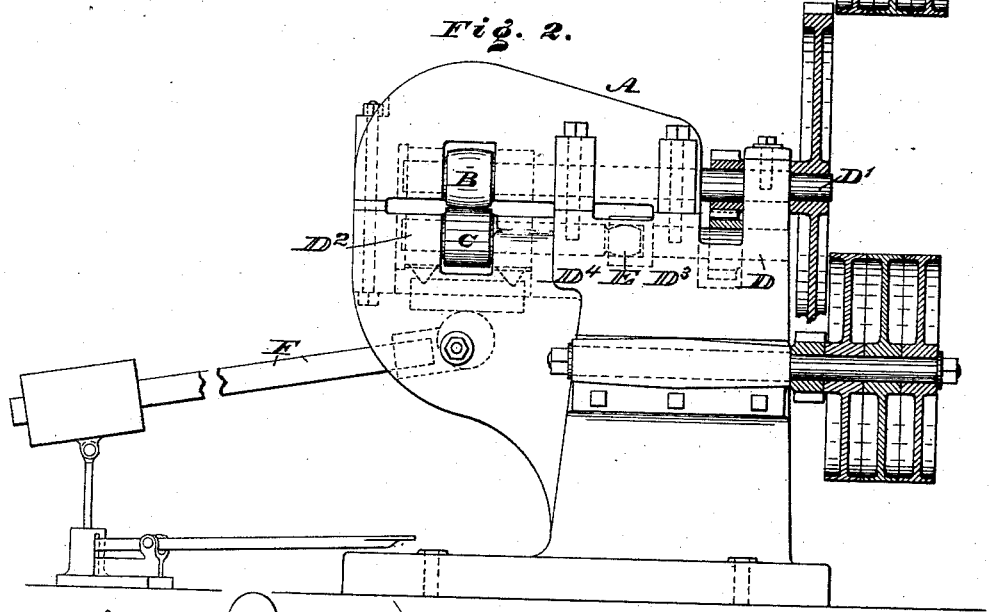
Figure 3:
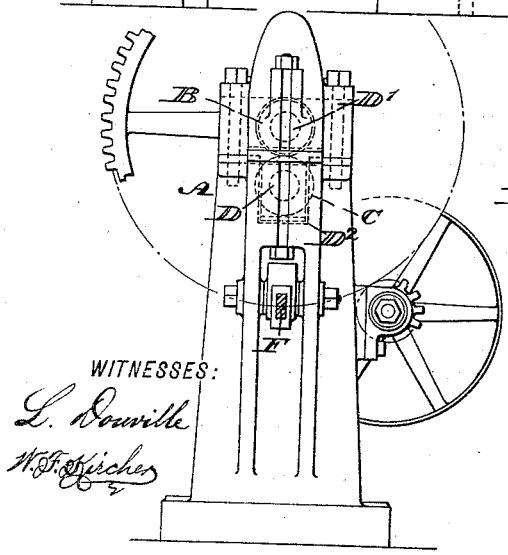

Figure 1 represents a top or plan view, a portion thereof being in section, of a saw-rolling machine embodying my invention. Fig. 2 represents a partial side elevation and partial vertical section thereof. Fig. 3 represents an end view thereof, partly sectional.

Similar letters of reference indicate corresponding parts in the several figures.

My invention consists of a machine for rolling saws, by means of which the work is expeditiously and effectively accomplished and other advantages are presented, as will be hereinafter fully set forth.

Referring to the drawings, A represents the frame or housing of a saw-rolling machine, and B C represent two rollers which are secured to parallel shafts $D'$ D, which extend in horizontal direction, the shaft $D'$ being mounted on the housing and driven by suitable gearing, to which power is communicated in proper manner. The rollers are made of hardened steel, the roller C being cylindrical with a right-line surface, and the roller B having a rounded face lengthwise. The shaft D is sectional and partly mounted on the frame A and partly on a movable bearing, $D^2$, the sections $D^3$ $D^4$ being connected by a ball-and-socket or similar joint, as at E, whereby the section $D^4$, which carries the roller C, may be lowered and raised so as to separate the rollers and afterward return them in operative position, as seen in Fig. 2, the frame being vertically recessed to permit the section $D^4$ and connected parts to rise and fall. The roller C is held up to the roller B by a weighted lever, F, which is mounted on the frame or housing, and has its inner end bearing upwardly against the bearing $D^2$ of the section $D^4$ of the shaft D. When the outer end of the lever F is raised, the rollers B C separate, and the saw may be introduced between the rollers, the roller C then being permitted to rise. The rollers then rotate with the saw between them.

It is evident that by properly handling the saw in its passage through the rollers the blade which is subjected to the pressure thereof may be stretched or loosened just where it is required, and thus the correct tension of the saw may be produced, the saw thus being adapted to be kept in proper order.

Having thus described my invention, what I claim as new, and desire to secure by Letters Patent, is—

1. A saw-rolling machine having a shaft with fixed bearings and a roller with a rounded face mounted thereon, and a sectional shaft having a fixed bearing at one end and provided with a cylindrical roller having a right-line surface, said parts being combined and operating substantially as described.

2. The roller B with shaft $D'$, carrying the same, the roller C with the sectional shaft D, carrying the same, and the weighted lever F, bearing against the bearing of the movable portion of the sectional shaft, said parts being combined and operating substantially as and for the purpose set forth.

3. A saw-rolling machine consisting of the upper and lower shafts $D'$ and D, the upper shaft having fixed bearings and carrying the roller B, having a rounded face, the lower shaft being in sections connected by a ball-and-socket joint and having at one end a vertically-adjustable bearing, means to rotate said shafts $D'$ and D, and means, substantially as described, adapted to keep said roller C in contact with the roller B, all combined substantially as stated.

LYMAN O. ORTON.

Witnesses:
JOHN A. WIEDERSHEIM,
A. P. GRANT.